(12) United States Patent
Chiu et al.

(10) Patent No.: US 7,876,075 B1
(45) Date of Patent: Jan. 25, 2011

(54) CONTROL CIRCUIT AND METHOD FOR A POWER CONVERTER

(75) Inventors: Bo Yi Chiu, Xinying (TW); Dan Chen, Taipei (TW); Wei-Hsu Chang, Zhubei (TW)

(73) Assignee: Richtek Technology Corporation, ChuPei, Hsinchu (TW)

( * ) Notice: Subject to any disclaimer, the term of this patent is extended or adjusted under 35 U.S.C. 154(b) by 0 days.

(21) Appl. No.: 12/768,273

(22) Filed: Apr. 27, 2010

(30) Foreign Application Priority Data

Nov. 11, 2009 (TW) .............. 98138233 A

(51) Int. Cl.
*G05F 1/613* (2006.01)
(52) U.S. Cl. ................. 323/229; 323/283
(58) Field of Classification Search .......... 323/229, 323/283, 282
See application file for complete search history.

(56) References Cited

U.S. PATENT DOCUMENTS 6,040,688 A * 3/2000 Strubin ............. 323/368

\* cited by examiner

*Primary Examiner*—Shawn Riley

(57) ABSTRACT

A control circuit and control method for a power converter detects change of the output voltage of the converter, and performs the time-optimal control function when the change exceeds the default value. According to the voltage slew rate detected at the time of the change exceeding the default value, a time interval $T_1$ from the change exceeding the default value being detected to the current of the inductor rising to be the same as the output current of the converter is estimated, and the time intervals $T_2$ and $T_3$ are figured out based on the time interval $T_1$. The parasitic resistance of the output capacitor of the converter is taken into account during estimating process such that even if the output capacitor has larger parasitic resistance, the output voltage can be back to the steady state value accurately to avoid the time-optimal control being triggered repeatedly.

9 Claims, 14 Drawing Sheets

CONTROL CIRCUIT AND METHOD FOR A POWER CONVERTER

BACKGROUND OF THE INVENTION

1. Field of the Invention

The present invention is related to a power converter, and particularly to a control circuit and method for the power converter.

2. Brief Description of the Related Art

Due to the semiconductor technology being developed progressively, the digital products such as the computer and the peripherals thereof are capable of being upgraded continuously. The fast change of the manufacturing process for the semiconductor results in a variety of demands for the power source of the integrated circuit (IC) employed in the computer and the peripherals thereof. Hence, the pulse width modulation voltage regulators composed of various power converters such as the boost converter and the buck converter to meet the need of different integrated circuits become one of the most important factors to determine if versatile digital products are capable of being presented.

The output voltage of a power converter should be maintained at a steady state instead of rising or dropping corresponding to change of the load during the power converter working normally. However, when the type of the output of the power converter during the load being drawn is instantaneous step change, most part of the current output of the power converter is provided with the output capacitor and it results in the voltage rising or dropping rapidly.

For solving this problem, literatures "Z. Zhao, A. Prodic, Continuous-time digital controller for high-frequency DC-DC converters, IEEE TRANSACTIONS ON POWER ELECTRONICS, March 2008" and "E. Meyer, Z. Zhang, Y.-F. Liu, An optimal control method for buck converters using a practical capacitor charge balance technique, IEEE TRANSACTIONS ON POWER ELECTRONICS, JULY 2008" have proposed the nonlinear control, and the authors entitle it as time-optimal control (TOC) method. When the instantaneous step change occurs during the load being drawn, the power switch is fully ON/OFF a period of time, and it is expected that the inductance current and the output voltage are capable of meeting the steady state of the output specification at end of the time-optimal control.

In addition, the literature "A. Costabeber, L. Corradini, P. Mattavelli, S. Saggini, Time optimal, parameters-insensitive digital controller for DC-DC buck converter, PESC, 2008" proposes two TOC methods suitable for buck converter, time-based TOC method and voltage-based TOC method. The fundamental theories of the two control methods are based on the wave shapes of voltage and current shown in FIG. 1 and stated hereinafter.

Steps of the time-based TOC method are detecting if change of the output voltage $V_o$ of the power converter exceeds a default value $\Delta V_{th}$, i.e., $t_0$ in FIG. 1, and starting the control if the change exceeds the default value $\Delta V_{th}$, detecting the lowest point $V_{valley}$ of the output voltage $V_o$ of the power converter and setting a time interval $T_1$ between $t_0$ and time corresponding to the lowest point $V_{valley}$, figuring out Q0 and Q1 of reducing voltages of the output capacitor and Q2 and Q3 of increasing voltages of the output capacitor according to the principle of electric charge equilibrium and setting Q0+Q1=Q2+Q3 such that it can be expected that $V_o$ restores to the original value thereof so as to calculate the time interval $T_1+T_2$ of the power switch being fully ON and the time interval $T_3$ of the power switch being fully OFF. The related equation is expressed in the following:

$$\begin{cases} C \cdot \Delta V_{th} + \int_0^{T_1} \int_0^t \frac{V_{in} - V_{ref}}{L} d\tau dt = \int_0^{T_2} \int_0^t \frac{V_{in} - V_{ref}}{L} d\tau dt + \\ \qquad \qquad \int_0^{T_3} \int_0^t \frac{V_{ref}}{L} d\tau dt \\ \frac{T_2}{T_3} = \frac{V_{ref}}{V_{in} - V_{ref}} = \frac{D}{1-D} \end{cases} \Rightarrow$$

$$\begin{cases} T_2 = \sqrt{D} \cdot \sqrt{T_1^2 + \frac{2LC \cdot \Delta V_{th}}{V_{in} - V_{ref}}} \\ T_3 = \frac{1-D}{D} \cdot T_2 \end{cases}$$

wherein $V_{ref}$ represents the reference voltage, $V_{in}$ represents an input voltage of the buck converter, L represents the inductance, C represents the output capacitance, and D represents the duty cycle of the buck converter at steady state.

Steps of the voltage-based TOC method are detecting if change of the output voltage $V_o$ of the power converter exceeds a default value $\Delta V_{th}$, i.e., $t_0$ in FIG. 1, and starting the control if the change exceeds the default value $\Delta V_{th}$, detecting the lowest point $V_{valley}$ of the output voltage $V_o$ of the power converter and setting a time interval $T_1$ between $t_0$ and time corresponding to the lowest point $V_{valley}$, figuring out a state transfer point $V_{sw}$ with the lowest point $V_{valley}$, measuring and setting a time interval $T_2$ between $V_{valley}$ and $V_{sw}$ for calculating the time interval $T_1+T_2$ of the power switch being fully ON and the time interval $T_3$ of the power switch being fully OFF. The related equation is expressed in the following:

$$\begin{cases} V_{sw} = V_{ref} - (1-D) \cdot (V_{ref} - V_{valley}) \\ T_3 = \frac{1-D}{D} \cdot T_2 \end{cases}$$

wherein $V_{ref}$ represents the reference voltage of the buck converter, and D represents the duty cycle of the buck converter at steady state.

It is ideally supposed in the preceding methods that no parasitic resistance in the output capacitor of the buck converter. In case of the parasitic resistance being taken into account, the preceding literatures propose a correction to extend time duration $R_c \cdot C$ for the power switch being ON, but it has been mentioned that the correction is not applied to a larger parasitic resistance. Besides, when the inductance L of the buck converter is getting smaller and the output capacitor C and the parasitic resistance are getting larger, $T_1$ detected with the time-based TOC method is 0, and the voltage-based TOC method is unable to figure out the voltage transfer point correctly due to the output voltage containing a voltage drop of the parasitic resistance. Hence, it is not possible for the output voltage of the power converter to restore to the steady state value at end of the TOC, and it results in the system triggering the TOC repeatedly and the circuit being incapable of working normally.

SUMMARY OF THE INVENTION

Accordingly, a main object of the present invention is to provide a control circuit and method for a power converter with which the output voltage is capable of restoring to the steady state value accurately even if greater parasitic resistance is in the output capacitor of the buck converter such that the phenomenon of the TOC being triggered repeatedly is avoided substantively.

In order to achieve the preceding object and other objects not mentioned above, a control circuit and method for a power converter, which are suitable for generating a stable voltage control signal to control ON/OFF of a power switch of a synchronous rectified buck converter with an inductor and an output capacitor; the control circuit comprises a difference generating circuit, a pulse width modulation circuit including such as a compensator and a pulse width modulator, a TOC circuit, and a multiplexer for performing the control method for the power converter.

Wherein, the difference generating circuit receives the output voltage and the reference voltage of the synchronous rectified buck converter and acquires a voltage difference between the output voltage and the reference voltage; the compensator generates a pulse width control signal based on the voltage difference; the pulse width modulator is controlled by the pulse width control signal and generates a pulse width modulation signal; the time-optimal control (TOC) circuit detects change of the output voltage, creates a time-optimal control signal and a select signal when the change exceeds a default value.

The time-optimal control signal is based on a voltage slew rate detected at the time of the change exceeding the default value to estimate a time interval $T_1$ from the change exceeding the default value being detected to the current of the inductor rising to be the same as the output current of the synchronous rectified buck converter, to figure out time intervals $T_2$ and $T_3$ based on the time interval $T_1$ for the time-optimal control signal maintaining at a level during the time intervals $T_1$ and $T_2$, maintaining at another level during the time interval $T_3$ and generating the select signal in the time intervals $T_1$, $T_2$ and $T_3$; the multiplexer is based on the select signal to select either the pulse width modulation signal sent out from the pulse width modulation circuit or the time-optimal control signal sent out from the TOC circuit to output the stable voltage control signal for controlling ON/OFF of the power switch of the synchronous rectified buck converter.

Wherein, the time interval $T_1$ is obtained via calculation of following equations:

$$T_{1up} = \frac{LC}{V_{in} - V_{ref}} \cdot \left[ \frac{R_c}{L}(V_{in} - V_{ref}) - \frac{dV_o(t)}{dt}\bigg|_{t=t_0} \right]$$

-continued $$T_{1down} = \frac{LC}{V_{ref}} \cdot \left[ \frac{R_c}{L} \cdot V_{ref} + \frac{dV_o(t)}{dt}\bigg|_{t=t_0} \right]$$

wherein T1_up represents a time interval $T_1$ during load increasing, T1_down represents a time interval $T_1$ during load decreasing, $V_{in}$ represents an input voltage of the synchronous rectified buck converter, $V_o$ represents the output voltage, $V_{ref}$ represents the reference voltage, L represents the inductance, C represents the capacitance, and $R_C$ represents a parasitic resistance of the output capacitor.

Wherein, the time intervals $T_2$ and $T_3$ are obtained via calculation of following equations:

$$\Delta V_{c0} = \Delta V_{th} - \Delta I_0 \cdot R_c$$

$$T_{2up} = \sqrt{D} \cdot \sqrt{T_{1\_up}^2 + \frac{2LC \cdot \Delta V_{c0}}{V_{in} - V_{ref}}}$$

$$T_{3up} = \frac{1-D}{D} \cdot T_{2up}$$

$$T_{2up} = \sqrt{1-D} \cdot \sqrt{T_{1down}^2 + \frac{2LC \cdot \Delta V_{c0}}{V_{ref}}}$$

$$T_{3down} = \frac{D}{1-D} \cdot T_{2down}$$

wherein $T_{2\_up}$ and $T_{3\_up}$ represent $T_2$ and $T_3$ time intervals during load increasing, $T_{2\_down}$ and $T_{3\_down}$ represent $T_2$ and $T_3$ time intervals during load decreasing, $\Delta V_{th}$ represents the default value, $\Delta I_o$ represents increment or decrement of the output current of the synchronous rectified buck converter, and D represents a duty cycle of the pulse width modulation signal.

In a preferred embodiment, the TOC circuit includes a first comparator, a second comparator and a controller to perform the steps of the control method respectively; the first compensator detects change of sudden rise of the output voltage, and outputs a voltage sudden rise signal when the change of sudden rise of the output voltage exceeds the default value; the second comparator detects change of sudden drop of the output voltage, and outputs a voltage sudden drop signal when the change of sudden drop of the output voltage exceeds the default value; the controller generates the time-optimal control signal and the select signal based on the voltage sudden rise signal and the voltage sudden drop signal.

As it has been previously stated, a control circuit and control method for a power converter according to the present invention has taken the parasitic resistance of the output capacitor of the buck converter into account at the time of calculating the time intervals $T_1$, $T_2$ and $T_3$. Therefore, it allows the output voltage restores to the steady state value accurately even if the output capacitor has larger parasitic resistance, and the situation regarding the TOC being triggered repeatedly can be avoid substantively.

BRIEF DESCRIPTION OF THE DRAWINGS

The detailed structure, the applied principle, the function and the effectiveness of the present invention can be more fully understood with reference to the following description and accompanying drawings, in which.

DETAILED DESCRIPTION OF THE INVENTION

Figure 2:
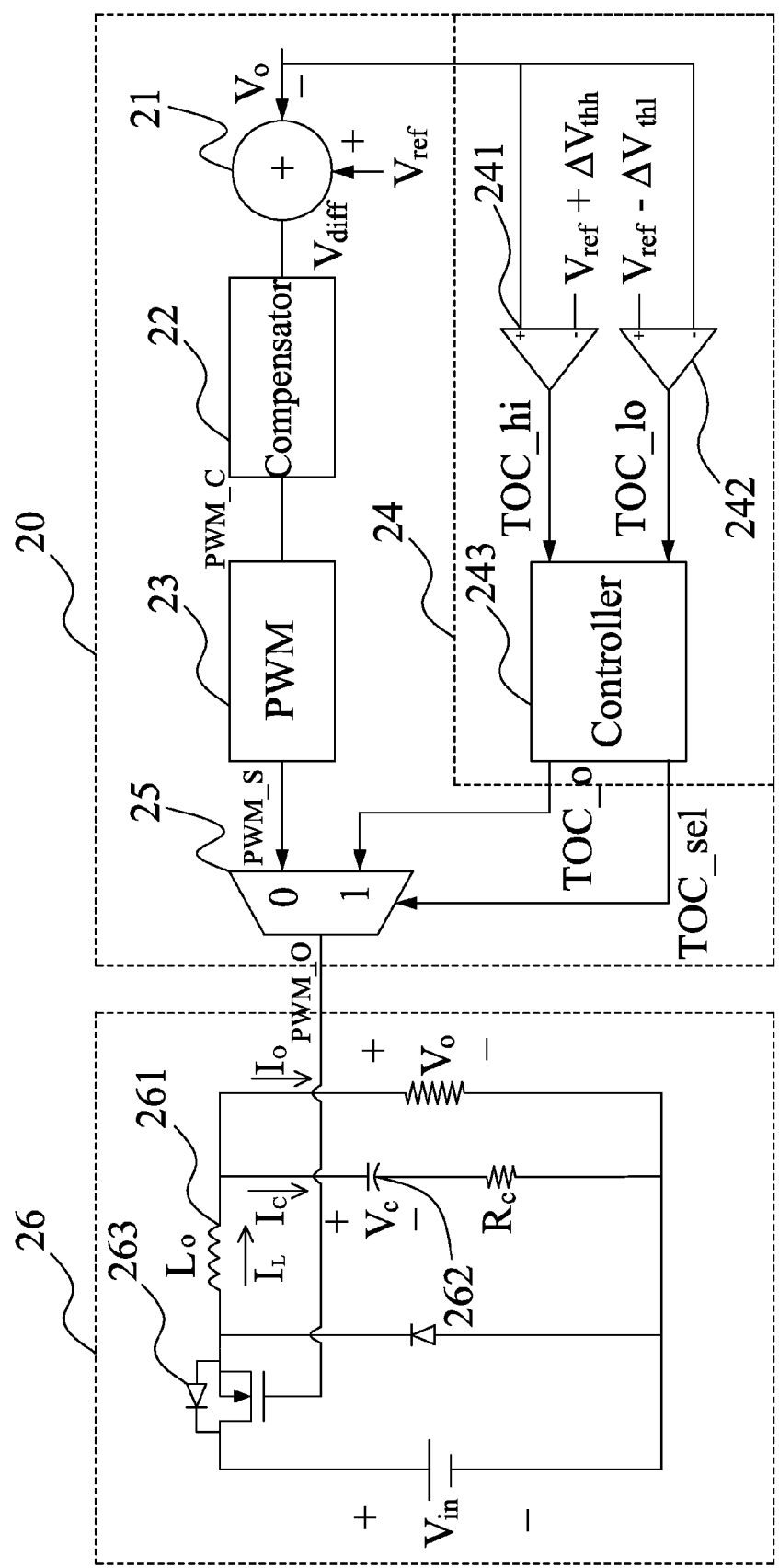
FIG. 2 is a block diagram illustrating a preferred embodiment of a control circuit for a power converter according to the present invention.

Referring to FIG. 2, the preferred embodiment of a control circuit for a power converter according to the present invention is illustrated. In FIG. 2, the control circuit 20 comprises a difference generation circuit such as an adder 21, a pulse width modulation circuit including a compensator 22 and a pulse width modulator 23, a time-optimal control circuit 24 and a multiplexer 25. The preceding components perform steps of the control method for the power converter, and a stable voltage control signal PWM_O can be generated to control ON/OFF of a power switch 263 of the synchronous-rectified buck converter 26 which has the inductor 261 and the output capacitor 262.

Wherein the adder 21 receives an reference voltage $V_{ref}$ and an output voltage $V_o$ of the synchronous-rectified buck converter 26 to acquire an voltage difference $V_{diff}$ between the output voltage $V_o$ and the reference voltage $V_{ref}$. The compensator 22, which can be a digital compensator, references to the voltage difference $V_{diff}$ sent out by the adder 21 to generate a pulse width control signal PWM_C. The pulse width modulator 23 is controlled by the pulse width control signal PWM_C to create a pulse modulation signal PWM_S. The time-optimal control (TOC) circuit 24 detects change of the output voltage $V_o$ of the synchronous-rectified buck converter 26. When the change of the output voltage $V_o$ exceeds a default value $\Delta V_{th}$, a time-optimal control signal TOC_o and a selection signal TOC_sel are produced for the multiplexer 25 selectively generating the stable voltage control signal PWM_O.

Figure 1:
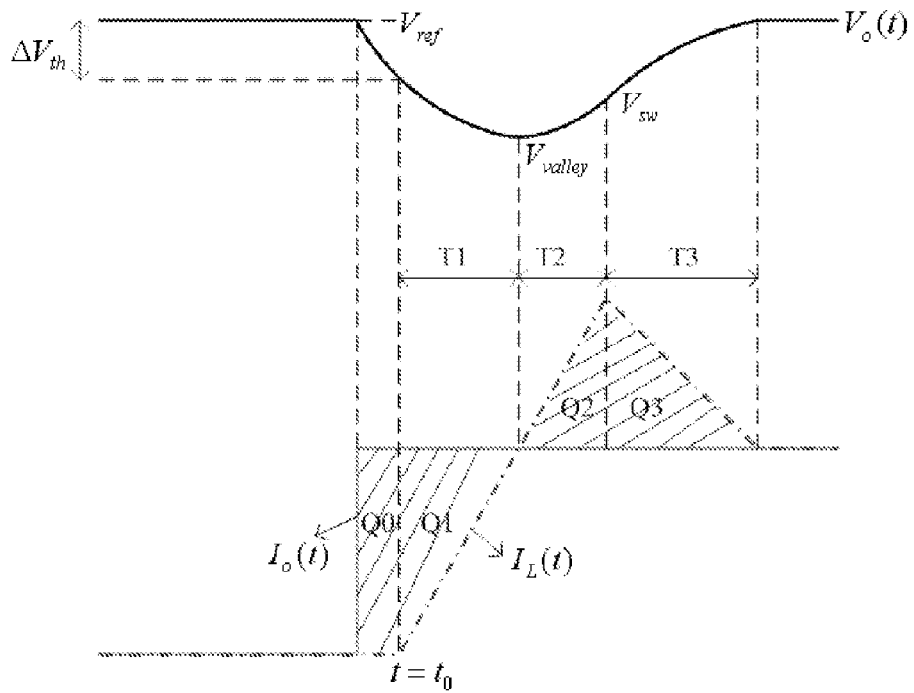
FIG. 1 is a graph illustrating voltage and current wave shapes during the load of the buck converter increasing when the conventional method of time-optical control is applied.
Figure 3:
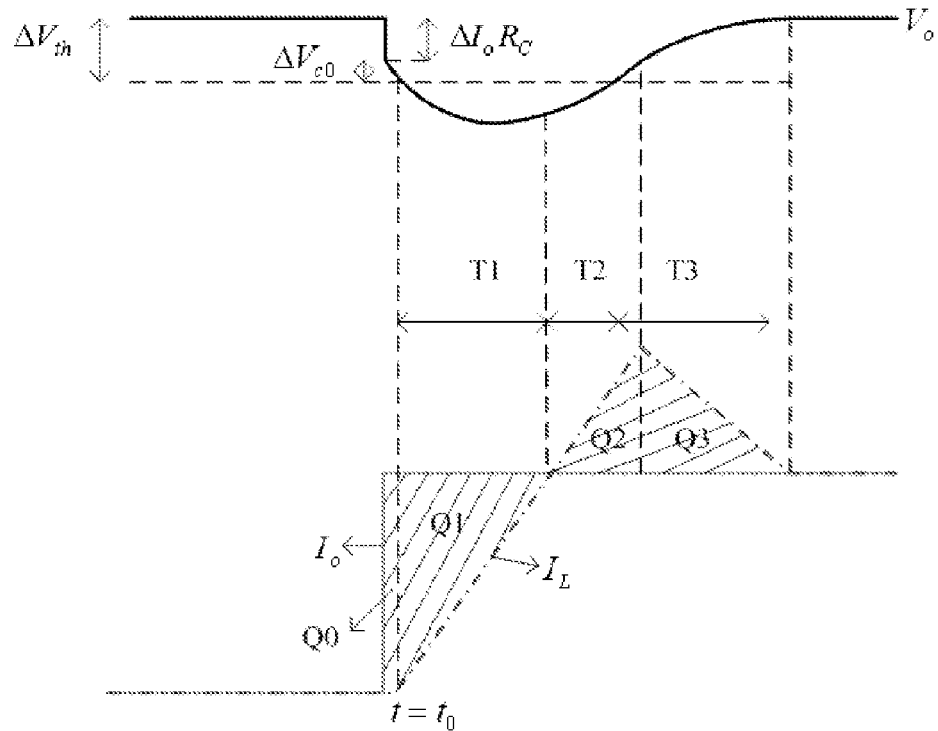
FIG. 3 is a graph illustrating voltage and current wave shapes during the load of the buck converter increasing when a control method corresponding to the control circuit for a power converter shown in FIG. 2 is applied.

Referring to FIG. 3 with reference to FIG. 2, FIG. 3 shows the wave shapes of the voltage and the current of the buck converter in a state of load increasing when the control method applies to the control circuit of the power converter shown in FIG. 2. As described previously, the conventional time-based TOC method and the voltage-base TOC method reference to wave shapes of the voltage and the current shown in FIG. 1 as the theoretical basis of control without considering the parasitic resistance $R_C$ of the output capacitor 262. However, it results in that the output voltage $V_o$ of the synchronous-rectified buck converter 26 is incapable of restoring to the steady state value after the time-optimal control is done such that the system probably triggers the time-optical control repeatedly and it leads to be unable to perform the work normally. Thus, the control method adopted by the TOC control circuit 24 of the control circuit 20 for power converter shown in FIG. 2 is to take the parasitic resistance $R_C$ of the output capacitor 262 into account to avoid the situation of the TOC being triggered repeatedly.

Therefore, the time-optimal control signal TOC_o estimates a time period $T_1$ from the change of the output voltage $V_o$ exceeding the default value $\Delta V_{th}$ to an current $I_L$ of the inductor 261 rising to a value the same as an output current $I_o$ of the synchronous rectified buck converter 26 according to the voltage slew rate at the time of the change of the output voltage $V_o$ exceeding the default value $\Delta V_{th}$, and then figures out time periods $T_2$ and $T_3$ based on the time interval $T_1$ for the time-optimal control signal TOC_o being at a reference level to keep the power switch 263 being in a state of ON during the time intervals $T_1$ and $T_2$ and being at a reference level to keep the power switch 263 being in a state of OFF during the time interval $T_3$ and creating the aforementioned selection signal TOC_sel during the time intervals $T_1$, $T_2$ and $T_3$.

The selection signal TOC_sel acts as a mode switching signal of the multiplexer 25 to output the pulse width modulation signal PWM_S sent out from the pulse width modulator 23 as the stable voltage control signal PWM_O to control ON and OFF of the power switch 263 of the synchronous rectified buck converter 26 when the linear mode of normal work is selected; the time-optimal control signal TOC_o sent out from the TOC circuit 24 is output as the stable voltage control signal PWM_O to control ON and OFF of the power switch 263 of the synchronous rectified buck converter 26 when the change of the output voltage $V_o$ exceeds the default value $\Delta V_{th}$ and enters the TOC mode such that the power switch 263 is in a state of ON during the time intervals $T_1$ and $T_2$ and the power switch 263 is in a state of OFF during the time interval $T_3$. The way to estimate the time intervals $T_1$, $T_2$ and $T_3$ is stated hereinafter.

Figure 4:
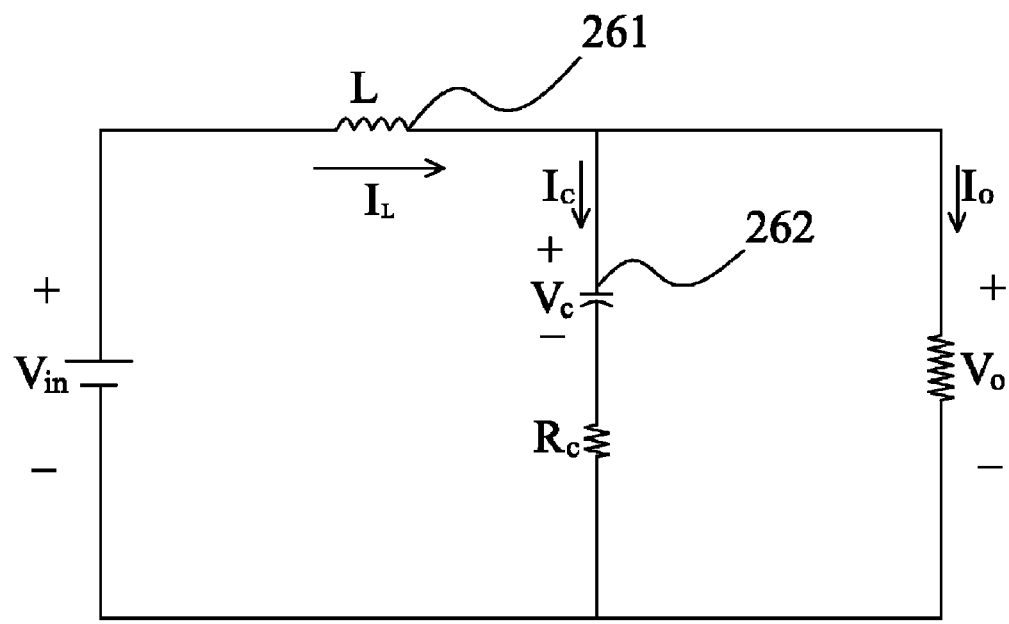
FIG. 4 is an equivalent circuit to the synchronous rectified buck converter shown in FIG. 2 at the time of the power switch conduction.

When the TOC mode is entered, the power switch 263 of the synchronous rectified buck converter 26 shown in FIG. 2 is controlled by the stable voltage control signal PWM_O and becomes ON with an equivalent circuit shown in FIG. 4. Therefore, the output current increment $\Delta I_o$ of the synchronous rectified buck converter 26 in time $t_o$ is expressed as:

$$\Delta I_0 = I_0(t_0) - I_L(t_0) = -I_C(t_0) = -C \frac{dV_C(t)}{dt}\bigg|_{t=t_0} \quad (1)$$

wherein C represents capacitance of the output capacitor 262. The rising slope of the current of the inductor 261 is approximate to:

$$\frac{dI_L(t)}{dt} \cong \frac{V_{in} - V_{ref}}{L}$$

and $$V_o(t) = V_C(t) + I_C(t)R_C \Rightarrow \frac{dV_o(t)}{dt} = \frac{dV_C(t)}{dt} + R_C \frac{dI_C(t)}{dt} \Rightarrow \frac{dV_o(t)}{dt} =$$

$$\frac{dV_C(t)}{dt} + R_C \frac{d}{dt}(I_L(t) - I_o) \Rightarrow \frac{dV_o(t)}{dt} \cong \frac{dV_C(t)}{dt} + R_C \frac{V_{in} - V_{ref}}{L} \Rightarrow$$

$$\frac{dV_C(t)}{dt} \cong \frac{dV_o(t)}{dt} - R_C \frac{V_{in} - V_{ref}}{L}$$

wherein $V_{in}$, and $V_o$ represent the input voltage and output voltage of the synchronous rectified buck converter 26 respectively, $V_{ref}$ represents reference voltage, L represents inductance of the inductor 261, and $R_c$ represents parasitic resistance of the output capacitor 262. The preceding expression is substituted in equation (1) and it can be obtained:

$$\Delta I_0 = -C \frac{dV_C(t)}{dt}\bigg|_{t=t_0} = C\left[\frac{R_C}{L}(V_{in} - V_{ref}) - \frac{dV_o(t)}{dt}\bigg|_{t=t_0}\right] \quad (2)$$

Hence, time interval $T_1$ for load increasing $T_{1\_up}$ can be obtained via calculation of the following equation:

$$\Delta I_0 = T_{1\_up} \cdot \frac{V_{in} - V_{ref}}{L} = C\left[\frac{R_C}{L}(V_{in} - V_{ref}) - \frac{dV_o(t)}{dt}\bigg|_{t=t_0}\right] \Rightarrow T_{1\_up} = \quad (3)$$

$$\frac{LC}{V_{in} - V_{ref}} \cdot \left[\frac{R_c}{L}(V_{in} - V_{ref}) - \frac{dV_o(t)}{dt}\bigg|_{t=t_0}\right]$$

In FIG. 3, when the change of the output voltage $V_o$ exceeding the default value $\Delta V_{th}$ are detected to enter the TOC mode at the time $t_0$, the output capacitor 262 has lost part of electric charges $Q_0 = C \cdot \Delta V_{CO}$, wherein $$\Delta V_{C0} = \Delta V_{th} - \Delta I_O \cdot R_C$$

$$\Rightarrow \Delta V_{C0} = \Delta V_{th} - I_C(t)_{t=t_0} \cdot R_C \quad (4)$$

In equation (4), when $\Delta V_{CO}$ is calculated as a negative value, it means the output capacitor 262 does not lose electric charges before entering the TOC mode. Under this circumference, it is correct that $\Delta V_{CO}$ has to be set as 0. According to the theory of electric charge equilibrium, the time intervals $T_2$ and $T_3$ for load increasing $T_{2\_up}$ and $T_{3\_up}$ can be obtained via calculation of the following equation:

$$\begin{cases} C \cdot \Delta V_{C0} + \int_0^{T_1} \int_0^t \frac{V_{in} - V_{ref}}{L} d\tau dt = \int_0^{T_2} \int_0^t \frac{V_{in} - V_{ref}}{L} d\tau dt + \int_0^{T_3} \int_0^t \frac{V_{ref}}{L} d\tau dt \\ \frac{T_2}{T_3} = \frac{V_{ref}}{V_{in} - V_{ref}} = \frac{D}{1-D} \end{cases} \Rightarrow \quad (5)$$

$$\begin{cases} T_{1\_up} = \frac{LC}{V_{in} - V_{ref}} \cdot \left(\frac{R_C}{L}(V_{in} - V_{ref}) - \frac{dV_o(t)}{dt}\bigg|_{t=t_0}\right) \\ T_{2\_up} = \sqrt{D} \cdot \sqrt{T_{1\_up}^2 + \frac{2LC \cdot \Delta V_{C0}}{V_{in} - V_{ref}}} \\ T_{3\_up} = \frac{1-D}{D} \cdot T_{2\_up} \end{cases}$$

Wherein D represents duty cycle of the pulse width modulation signal PWM_S.

Figure 5:
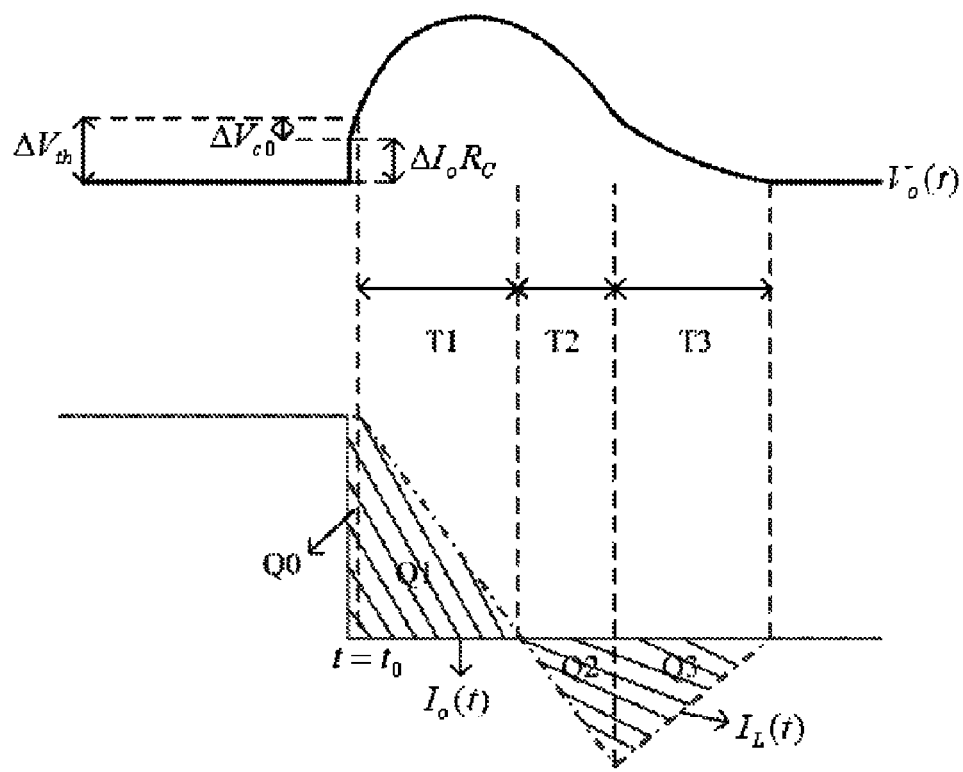
FIG. 5 is a graph illustrating voltage and current wave shapes during the load of the buck converter decreasing when a control method corresponding to the control circuit for a power converter shown in FIG. 2 is applied.

Referring to FIG. 5, the wave shapes of the voltage and the current of the buck converter in a state of load decreasing when the control method applies to the control circuit of the power converter shown in FIG. 2. According to the same principle, the time intervals $T_1$, $T_2$ and $T_3$ for load decreasing $T_{1\_down}$, $T_{2\_down}$ and $T_{3\_down}$ can be obtained via calculation of the following equation:

$$\begin{cases} C \cdot \Delta V_{C0} + \int_0^{T_1} \int_0^t \frac{V_{ref}}{L} d\tau dt = \int_0^{T_2} \int_0^t \frac{V_{ref}}{L} d\tau dt + \int_0^{T_3} \int_0^t \frac{V_{in} - V_{ref}}{L} d\tau dt \\ \frac{T_2}{T_3} = \frac{V_{in} - V_{ref}}{V_{ref}} = \frac{1-D}{D} \end{cases} \Rightarrow \quad (6)$$

$$\begin{cases} T_{1\_down} = \frac{LC}{V_{ref}} \cdot \left( \frac{R_C}{L} \cdot V_{ref} + \frac{dV_o(t)}{dt} \bigg|_{t=t_0} \right) \\ T_{2\_down} = \sqrt{1-D} \cdot \sqrt{T_{1\_down}^2 + \frac{2LC \cdot \Delta V_{C0}}{V_{ref}}} \\ T_{3\_down} = \frac{D}{1-D} \cdot T_{2\_down} \end{cases}$$

In FIG. 2, the TOC circuit 24 is implemented with comparators 241, 242 and a controller 243. Wherein the comparator 241 detects a change of sudden rise of the output voltage $V_o$ and sends out a sudden voltage rise signal TOC_hi at the time of the output voltage $V_o$ suddenly rising over the default value $\Delta V_{th}$, and the comparator 242 detects a change of sudden drop of the output voltage $V_o$ and sends out a sudden voltage drop signal TOC_lo at the time of the output voltage $V_o$ suddenly dropping below the default value $\Delta V_{th}$.

The controller 243 is based on the sudden voltage rise signal TOC_hi and the sudden voltage drop signal TOC_lo and references to the equations (5) and (6) to figure out and create the aforementioned time-optimal control signal TOC_o and the selection signal TOC_sel such that the power switch 263 is ON at the time intervals $T_{1\_up}$ and $T_{2\_up}$ and is OFF at the time interval $T_{3\_up}$, or is OFF at the time intervals $T_{1\_down}$ and $T_{2\_down}$ and is ON at the time interval $T_{3\_up}$. In this way, the linear mode with the normal work can be resumed afterward.

Figure 6:
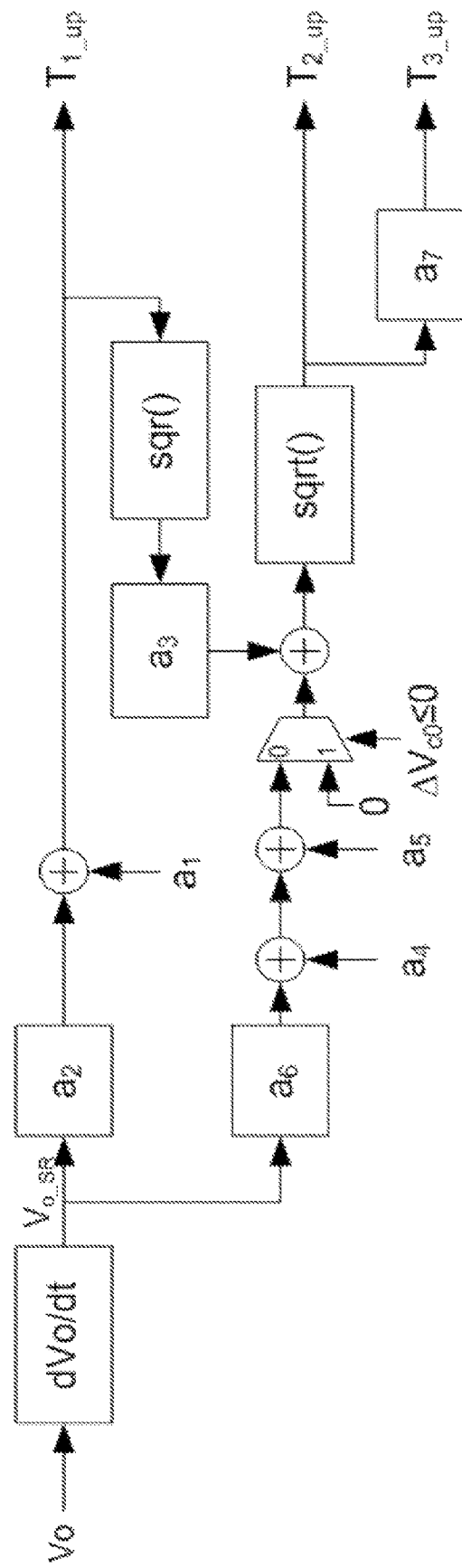
FIG. 6 is a block diagram illustrating a control circuit for a power converter shown in FIG. 2 during the load of the buck converter increasing.
Figure 7:
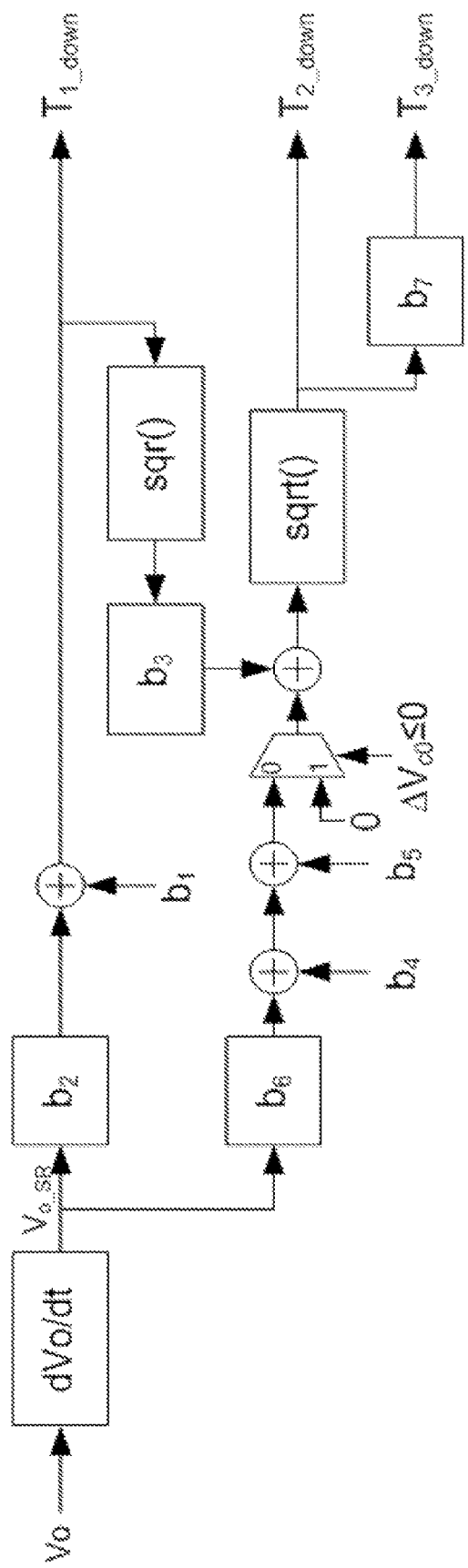
FIG. 7 is a block diagram illustrating a control circuit for a power converter shown in FIG. 2 during the load of the buck converter decreasing.

Referring to FIGS. 6 and 7, the block diagrams illustrated in FIGS. 6 and 7 are capable of implementing the controller 243 shown in FIG. 2. Wherein parameters a1, a2, a3, a4, a5, a6, and a7 are obtained via rearrangement of equation (5), and parameters b1, b2, b3, b4, b5, b6 and b7 are obtained via rearrangement of equation (6). The rearrangement for equations (5) and (6) is expressed hereinafter.

$$V_{O\_SR} = \frac{dV_o(t)}{dt}\bigg|_{t=t_0}$$

$$T_{1\_up} = \frac{LC}{V_{in} - V_{ref}} \left( \frac{R_c}{L}(V_{in} - V_{ref}) - V_{O\_SR} \right) =$$

$$R_c C - \frac{LC}{V_{in} - V_{ref}} V_{O\_SR} = a_1 + a_2 V_{O\_SR}$$

$$T_{2\_up} = \sqrt{T_{1\_up}^2 D + \frac{2LC\Delta V_{th}}{V_{in} - V_{ref}} D - 2LCR_c C \frac{R_c}{L} D + \frac{2LCR_c C}{V_{in} - V_{ref}} DV_{O\_SR}} =$$

$$\sqrt{a_3 T_{1\_up}^2 + a_4 + a_5 + a_6 D V_{O\_SR}}$$

$$T_{3\_up} = \frac{1-D}{D} T_{2\_up} = a_7 T_{2\_up}$$

wherein, when $\Delta V_{C0} \leq 0$, $T_{2\_up} = \sqrt{DT_{1\_up}^2} = \sqrt{a_3 T_{1\_up}^2}$, hence $$a_1 = R_c C$$

$$a_2 = -\frac{LC}{V_{in} - V_{ref}}$$

$$a_3 = D$$

$$a_4 = \frac{2LC\Delta V_{th}}{V_{in} - V_{ref}} D$$

$$a_5 = -2LCR_c C \frac{R_c}{L} D$$

$$a_6 = \frac{2LCR_c C}{V_{in} - V_{ref}} D$$

$$a_7 = \frac{1-D}{D} \text{ and}$$

$$T_{1\_down} = \frac{LC}{V_{ref}} \left( \frac{R_c}{L} V_{ref} + V_{O\_SR} \right) = R_c C + \frac{LC}{V_{ref}} V_{O\_SR} = b_1 + b_2 V_{O\_SR}$$

$$T_{2\_down} =$$

$$\sqrt{T_{1\_down}^2 (1-D) + \frac{2LC\Delta V_{th}}{V_{ref}}(1-D) - 2LCR_c C \frac{R_c}{L}(1-D) - \frac{2LCR_c C}{V_{ref}}(1-D)V_{O\_SR}} =$$

-continued $$T_{3\_down} = \frac{D}{1-D} T_{2\_down} = b_7 T_{2\_down}$$

$$\sqrt{b_3 T_{1\_down}^2 + b_4 + b_5 + b_6 V_{o\_SR}}$$

wherein, when $\Delta V_{C0} \leq 0$, $T_{2\_down} = \sqrt{(1)-D) \cdot T_{1\_down}^2} = \sqrt{\alpha_3 T_{1\_down}^2}$, hence $$b_1 = R_c C$$

$$b_2 = \frac{LC}{V_{ref}}$$

$$b_3 = 1 - D$$

$$b_4 = \frac{2LC\Delta V_{th}}{V_{ref}}(1-D)$$

$$b_5 = -2LCR_c C \frac{R_c}{L}(1-D)$$

$$b_6 = -\frac{2LCR_c C}{V_{ref}}(1-D)$$

$$b_7 = \frac{D}{1-D}$$

Figure 8:
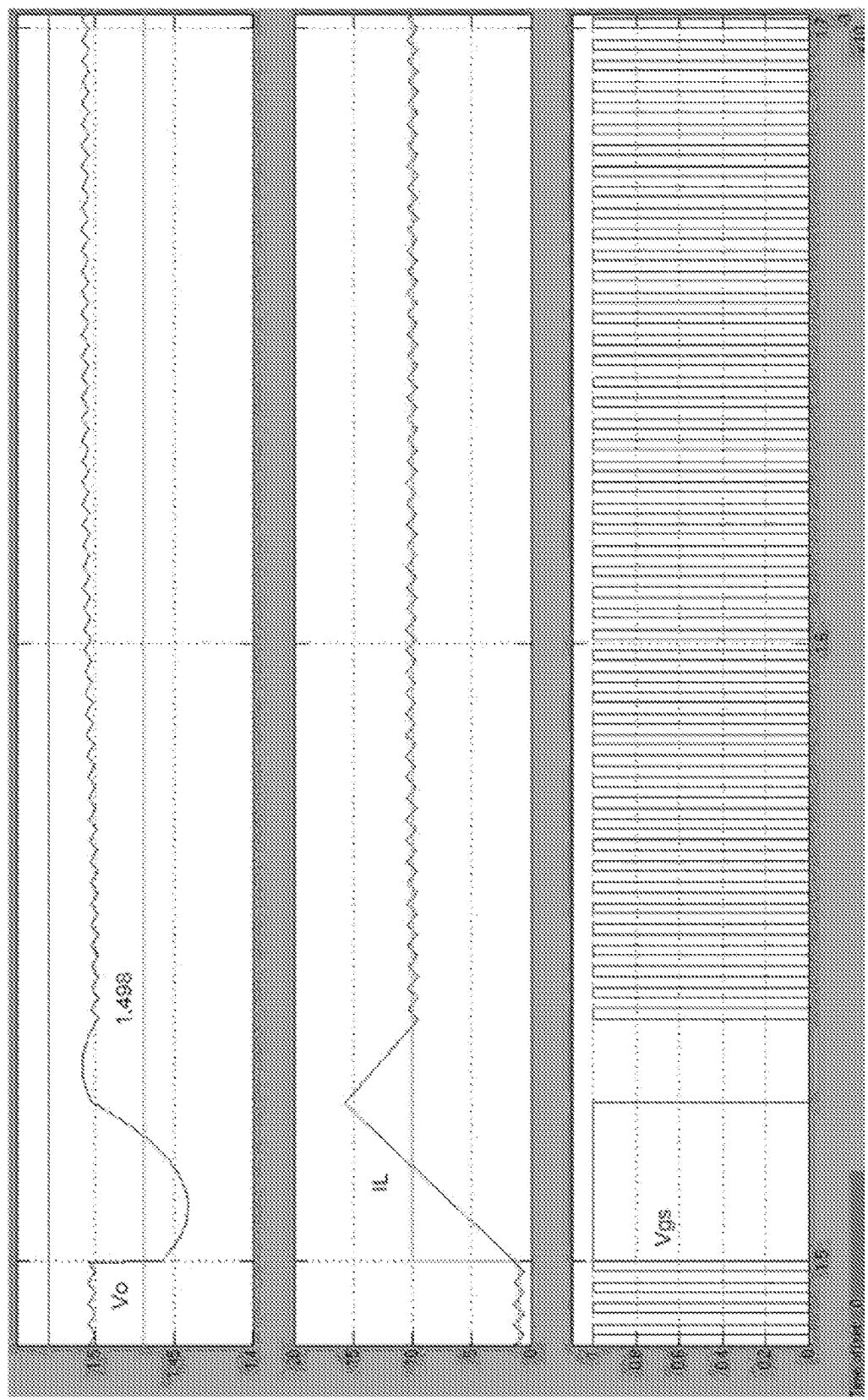
FIG. 8 is a graph shown simulating results of the time-based time-optimal control when the parasitic resistance of the output capacitor of the buck converter is $R_C=5$ m$\Omega$ with load increasing.
Figure 9:
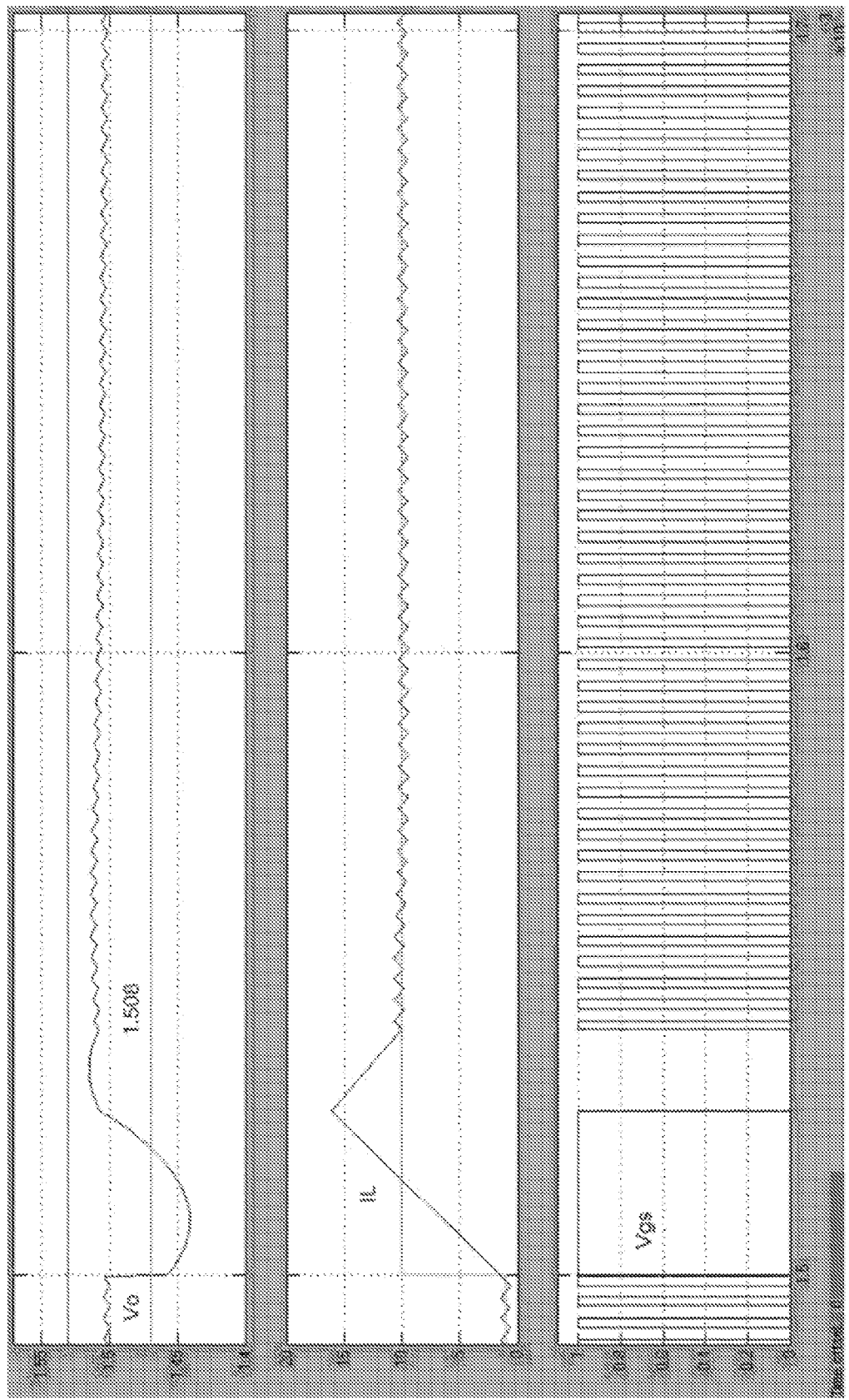
FIG. 9 is a graph shown simulating results of the voltage-based time-optimal control when the parasitic resistance of the output capacitor of the buck converter is $R_C=5$ m$\Omega$ with load increasing.
Figure 10:
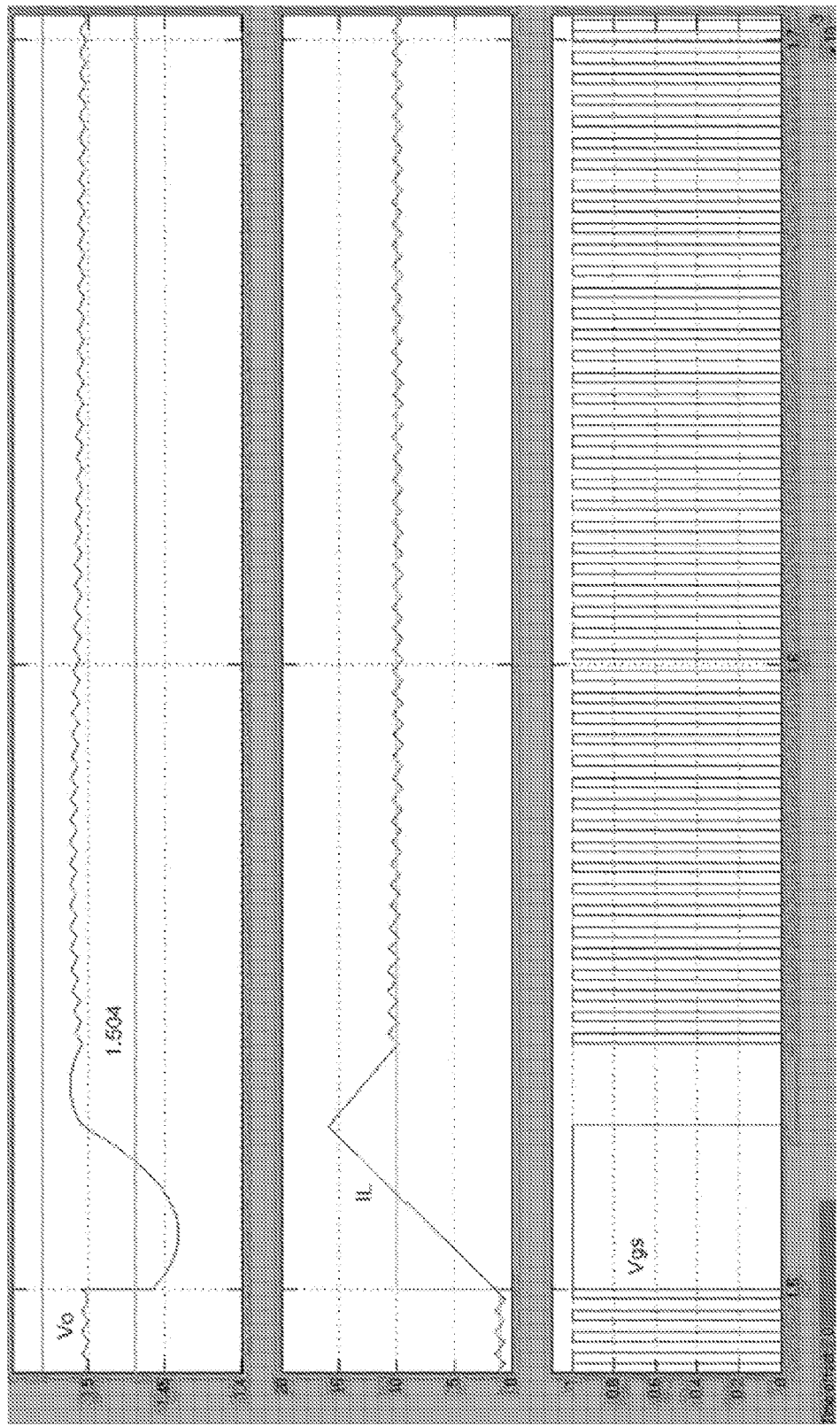
FIG. 10 is a graph shown simulating results of the voltage-slew-rate-based time-optimal control when the parasitic resistance of the output capacitor of the buck converter is $R_C=5$ m$\Omega$ with load increasing.

Referring to FIGS. 8 to 10, results of simulations for different TOC methods applying to load increasing are illustrated when the parasitic resistance of the output capacitor of the buck converter is $R_c=5$ mΩ. The parameters are set as the input voltage $V_{in}=3.3V$, the reference voltage $V_{rer}=1.5V$, the inductance L=3.3 µH, the output capacitance C=1300 µF, and the load current increasing to 10 A from 1 A. It can be learned from the results shown in the figures that good stable effect of the output voltage can be reached under the operation condition regardless the time-based TOC shown in FIG. 8, the voltage-based TOC shown in FIG. 9 and the voltage-slew-rate-based TOC shown in FIG. 10.

Figure 11:
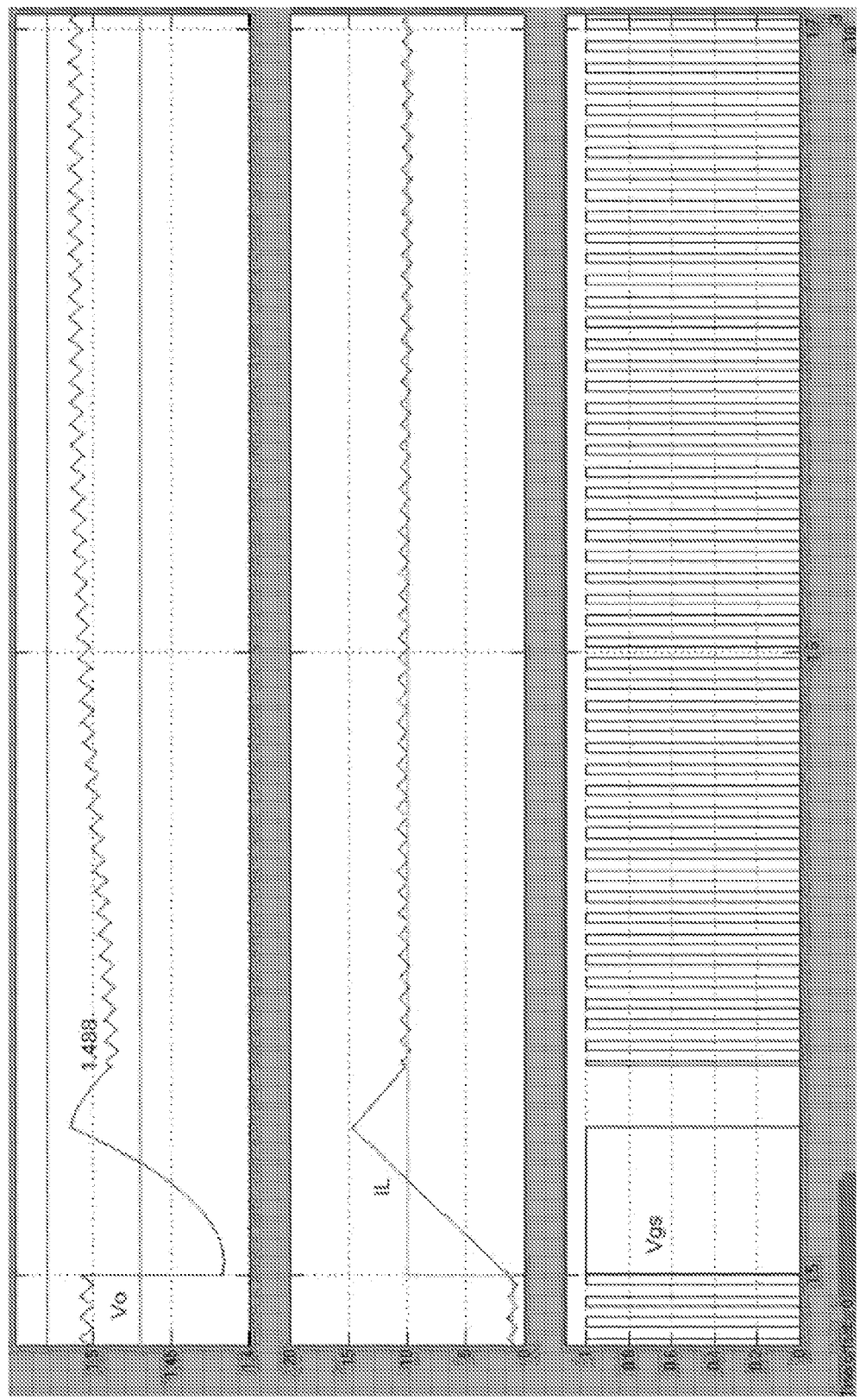
FIG. 11 is a graph shown simulating results of the time-based time-optimal control when the parasitic resistance of the output capacitor of the buck converter is $R_C=10$ m$\Omega$ with load increasing.
Figure 12:
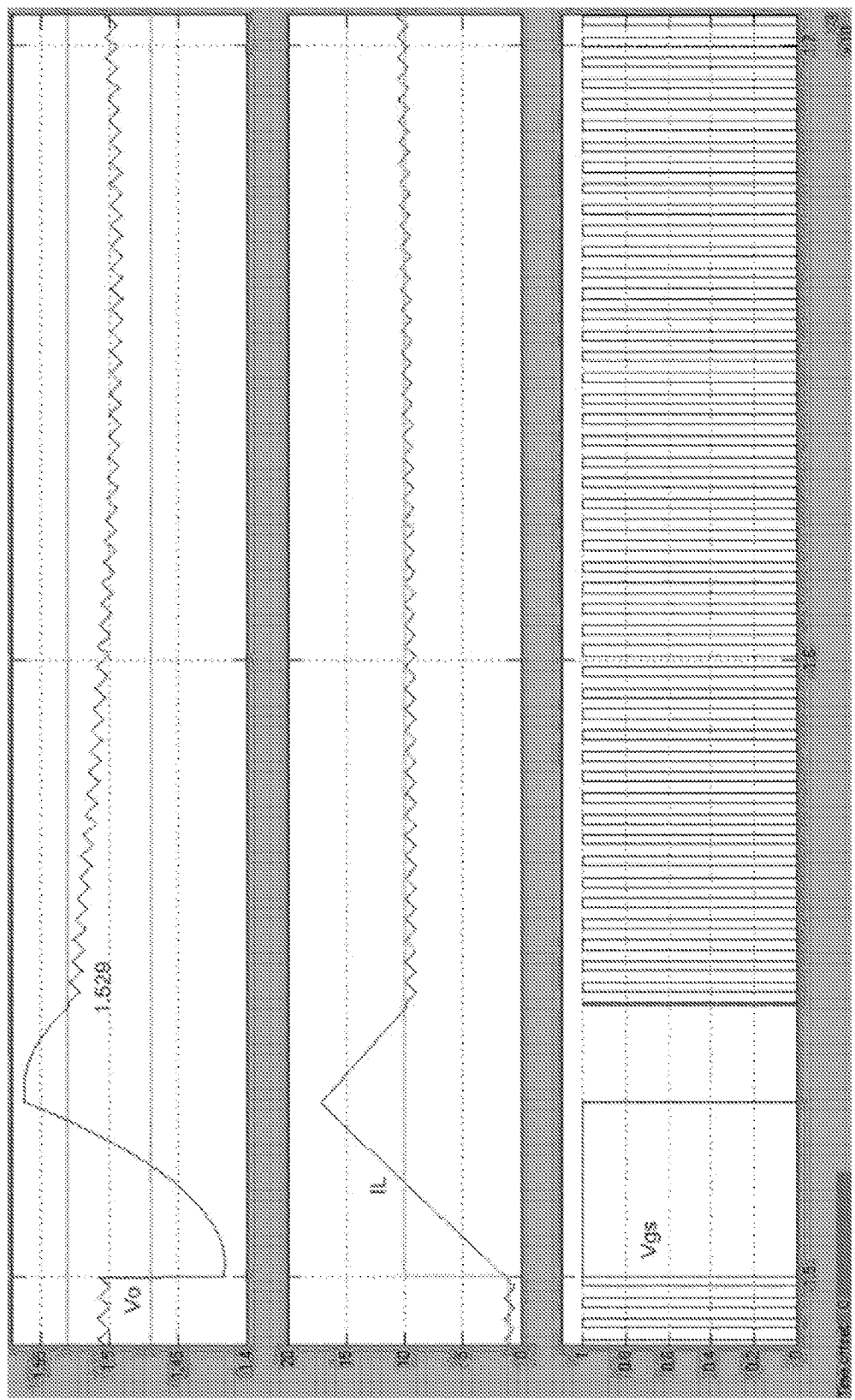
FIG. 12 is a graph shown simulating results of the voltage-based time-optimal control when the parasitic resistance of the output capacitor of the buck converter is $R_C=10$ m$\Omega$ with load increasing.
Figure 13:
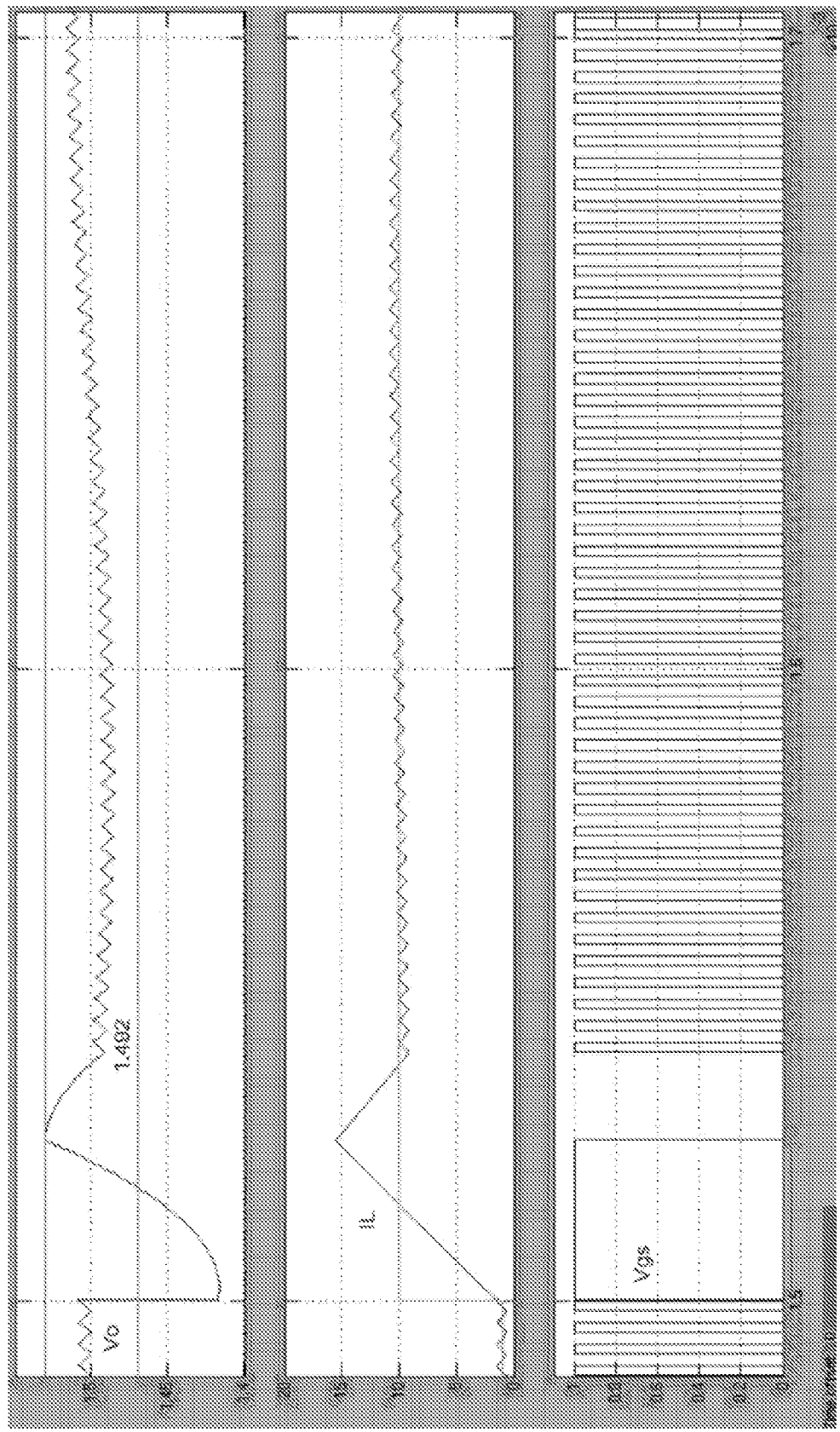
FIG. 13 is a graph shown simulating results of the voltage-slew-rate-based time-optimal control when the parasitic resistance of the output capacitor of the buck converter is $R_C=10$ m$\Omega$ with load increasing.

Referring to FIGS. 11 to 13, results of simulations for different TOC methods applying to load increasing are illustrated when the parasitic resistance of the output capacitor of the buck converter is $R_c=10$ mΩ. The parameters are the same as set in FIGS. 8 to 10. It can be seen that only result of the voltage-slew-rate-based TOC shown in FIG. 13 still reach good stable effects for the output voltage under the operation condition, but the result of the time-based TOC shown in FIG. 11 has lower output voltage and the result of the voltage-based TOC shown in FIG. 12 has higher output voltage when the work resumes to normal mode.

Figure 14:
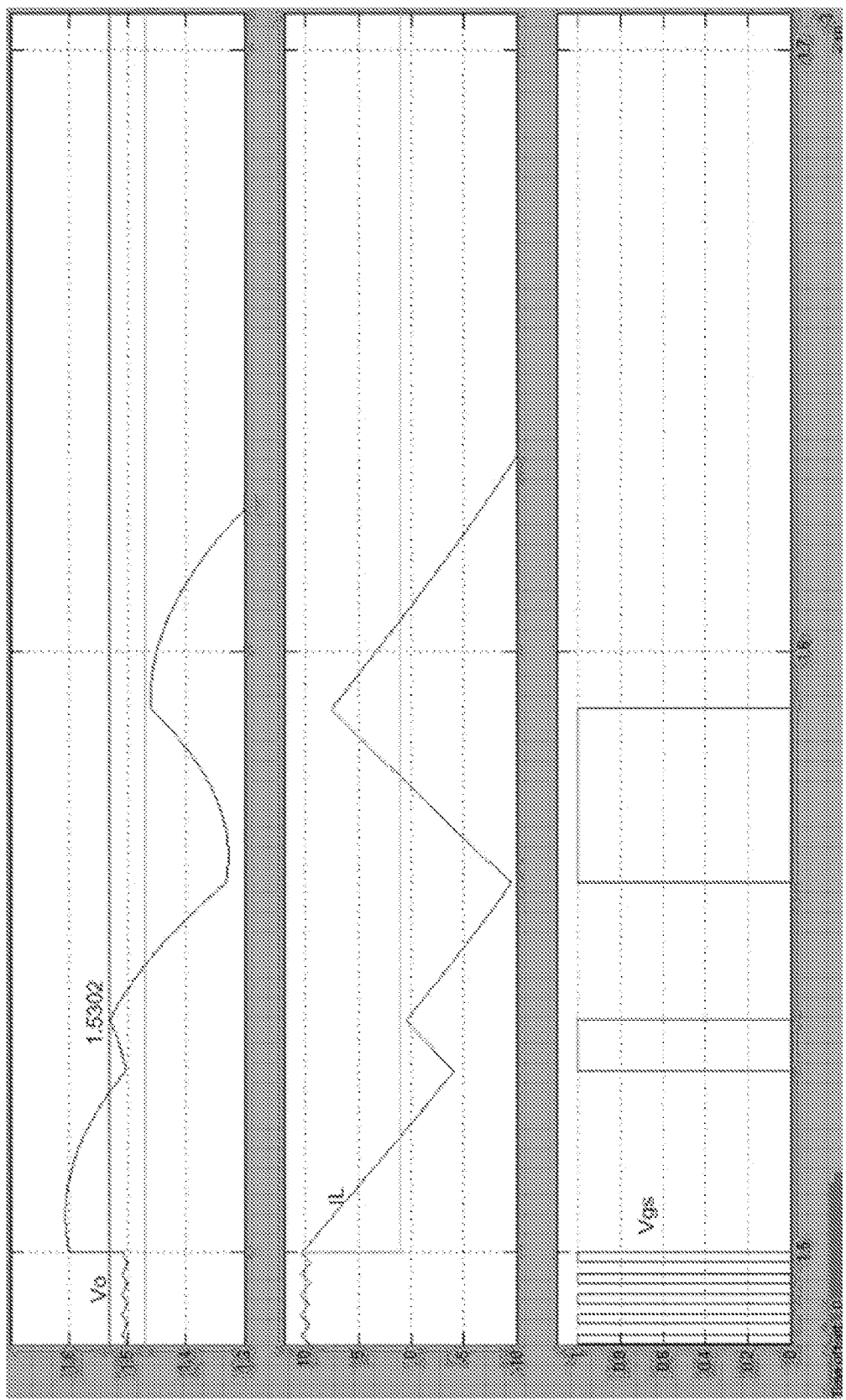
FIG. 14 is a graph shown simulating results of the time-based time-optimal control when the parasitic resistance of the output capacitor of the buck converter is $R_C=10$ m$\Omega$ with load decreasing.
Figure 15:
FIG. 15 is a graph shown simulating results of the voltage-based time-optimal control when the parasitic resistance of the output capacitor of the buck converter is $R_C=10$ m$\Omega$ with load decreasing.
Figure 16:
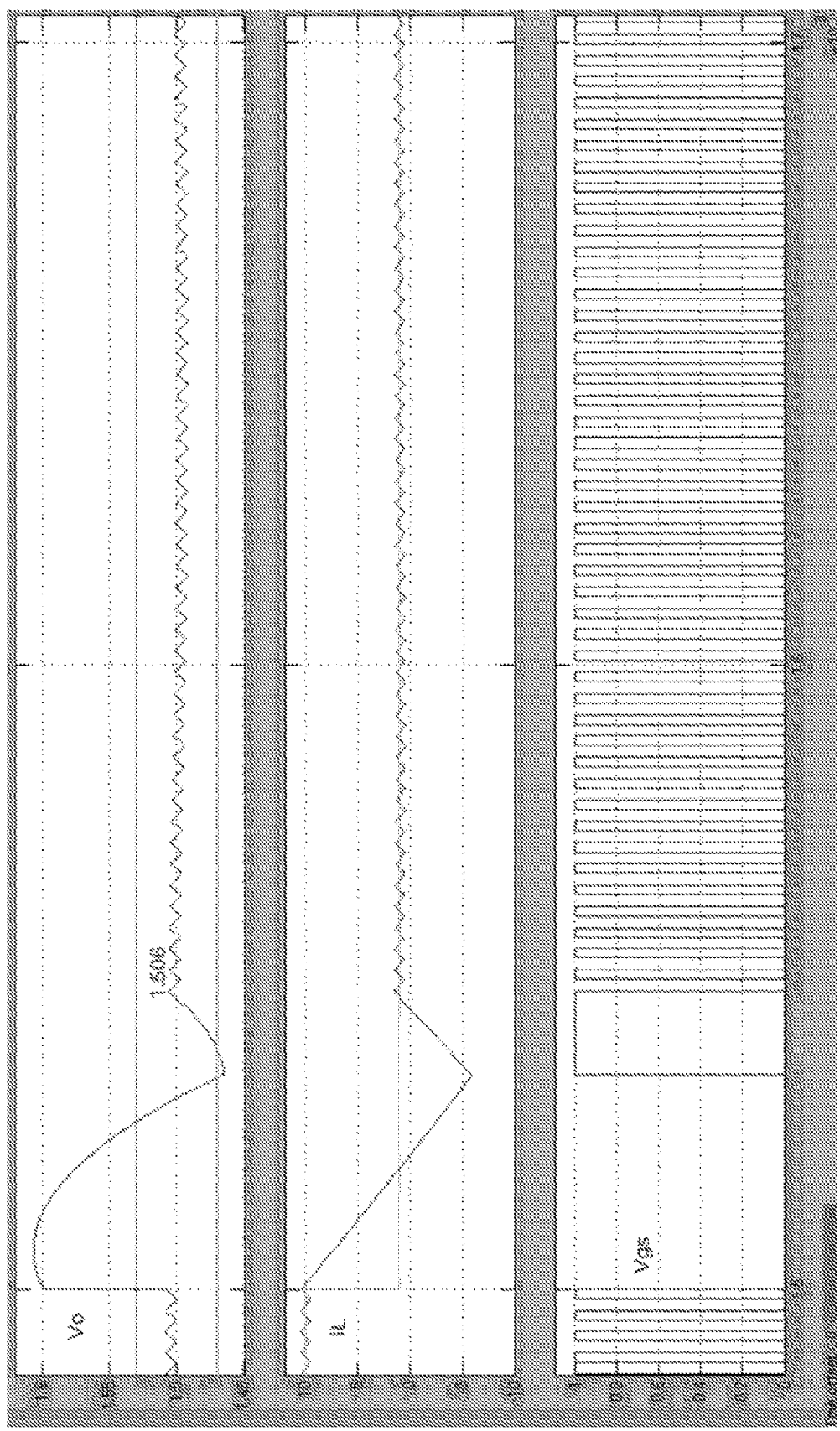
FIG. 16 is a graph shown simulating results of the voltage-slew-rate-based time-optimal control when the parasitic resistance of the output capacitor of the buck converter is $R_C=10$ m$\Omega$ with load decreasing.

Referring to FIGS. 14 to 16, results of simulations for different TOC methods applying to load decreasing are illustrated when the parasitic resistance of the output capacitor of the buck converter is $R_c=10$ mΩ. The parameters are the same as set in FIGS. 8 to 10. It can be seen that results of the time-based TOC shown in FIG. 14, or the voltage-based TOC shown in FIG. 15 is not possible for the output voltage to return to the stable state value with the situation of the TOC being triggered repeatedly. Nevertheless, the result of the voltage-slew-rate-based TOC shown in FIG. 16 reaches the good stable effect for the output voltage without the situation of the TOC being triggered repeatedly.

While the invention has been described with referencing to the preferred embodiment thereof, it is to be understood that modifications or variations may be easily made without departing from the spirit of this invention which is defined by the appended claims.

What is claimed is:

1. A control circuit for a power converter, which is suitable for generating a stable voltage control signal to control ON/OFF of a power switch of a synchronous rectified buck converter with an inductor and an output capacitor, comprising:
   a difference generating circuit receiving an output voltage and a reference voltage of said synchronous rectified buck converter and acquiring a voltage difference between the output voltage and the reference voltage;
   a pulse modulation circuit generating a pulse width modulation signal according to said voltage difference;
   a time-optimal control (TOC) circuit detecting a change of said output voltage, creating a time-optimal control signal and a select signal when said change exceeds a default value, said time-optimal control signal being based on a voltage slew rate detected at the time of said change exceeding said default value to estimate a time interval $T_1$ from said change exceeding said default value being detected to a current of said inductor rising to a value the same as an output current of said synchronous rectified buck converter, being based on said time interval $T_1$ to figure out time intervals $T_2$ and $T_3$ for the time-optimal control signal maintaining at a reference level at said time intervals $T_1$ and $T_2$ and maintaining at another reference level at said time interval $T_3$ and generating said select signal at the time intervals $T_1$, $T_2$ and $T_3$; and
   a multiplexer being based on said select signal to select said pulse width modulation signal or said time-optimal control signal being output as said stable voltage control signal.

2. The control circuit for a power converter as defined in claim 1, wherein said time interval $T_1$ is obtained via calculation of following equations:

$$T_{1\_up} = \frac{LC}{V_{in} - V_{ref}} \cdot \left[ \frac{R_c}{L}(V_{in} - V_{ref}) - \frac{dV_o(t)}{dt} \bigg|_{t=t_0} \right]$$

$$T_{1\_down} = \frac{LC}{V_{ref}} \cdot \left[ \frac{R_c}{L} \cdot V_{ref} + \frac{dV_o(t)}{dt} \bigg|_{t=t_0} \right]$$

wherein T1_up represents a time interval $T_1$ during load increasing, T1_down represents a time interval $T_1$ during load decreasing, $V_{in}$ represents an input voltage of said synchronous rectified buck converter, $V_o$ represents said output voltage, $V_{ref}$ represents said reference voltage, L represents the inductance of said inductor, C represents the capacitance of said output capacitor, and $R_C$ represents a parasitic resistance of said output capacitor.

3. The control circuit for a power converter as defined in claim 2, wherein said time intervals $T_2$ and $T_3$ are obtained via following equations:

$$\Delta V_{c0} = \Delta V_{th} - \Delta I_0 \cdot R_c$$

$$T_{2\_up} = \sqrt{D} \cdot \sqrt{T_{1\_up}^2 + \frac{2LC \cdot \Delta V_{c0}}{V_{in} - V_{ref}}}$$

$$T_{3\_up} = \frac{1-D}{D} \cdot T_{2\_up}$$

$$T_{2\_down} = \sqrt{1-D} \cdot \sqrt{T_{1\_down}^2 + \frac{2LC \cdot \Delta V_{c0}}{V_{ref}}}$$

$$T_{3\_down} = \frac{D}{1-D} \cdot T_{2\_down}$$

wherein $T_{2\_up}$ and $T_{3\_up}$ represent $T_2$ and $T_3$ time intervals during load increasing, $T_{2\_down}$ and $T_{3\_down}$ represent $T_2$ and $T_3$ time intervals during load decreasing, $\Delta V_{th}$ represents said default value, $\Delta I_o$ represents increment or decrement of the output current of said synchronous rectified buck converter, and D represents a duty cycle of said pulse width modulation signal.

4. The control circuit for a power converter as defined in claim 1, wherein said TOC circuit comprises:
a first comparator detecting a change of sudden rise of said output voltage, and outputting a voltage sudden rise signal when said change of sudden rise of said output voltage exceeds said default value;
a second comparator detecting a change of sudden drop of said output voltage, and outputting a voltage sudden drop signal when said change of sudden drop of said output voltage exceeds said default value; and
a controller generating said time-optimal control signal and said select signal according to said voltage sudden rise signal and said voltage sudden drop signal.

5. The control circuit for a power converter as defined in claim 1, wherein said pulse width modulation circuit comprises:
a compensator referencing to said voltage difference to generate a pulse width control signal; and
a pulse width modulator being controlled by said pulse width control signal and generating said pulse width modulation signal.

6. A control method of a control circuit for a power converter, which is suitable for generating a stable voltage control signal to control ON/OFF of a power switch of a synchronous rectified buck converter with an inductor and an output capacitor, comprising:
acquiring a voltage difference between an output voltage and a reference voltage of said synchronous rectified buck converter;
generating a pulse width modulation signal with reference to said voltage difference;
detecting a change of said output voltage, creating a time-optimal control signal and a select signal when said change exceeds a default value, said time-optimal control signal being based on a voltage slew rate detected at the time of said change exceeding said default value to estimate a time interval $T_1$ from said change exceeding said default value being detected to a current of said inductor rising to a value the same as an output current of said synchronous rectified buck converter, figuring out time intervals $T_2$ and $T_3$ based on said time interval $T_1$ for the time-optimal control signal maintaining at a reference level at said time intervals $T_1$ and $T_2$ and maintaining at another reference level at said time interval $T_3$ and generating said select signal at the time intervals $T_1$, $T_2$ and $T_3$; and
selecting and outputting said pulse width modulation signal or said time-optimal control signal as said stable voltage control signal according to said select signal.

7. The control method as defined in claim 6, wherein said time interval $T_1$ is obtained via calculation of following equation:

$$T_{1\_up} = \frac{LC}{V_{in} - V_{ref}} \cdot \left[ \frac{R_c}{L}(V_{in} - V_{ref}) - \frac{dV_o(t)}{dt}\bigg|_{t=t_0} \right]$$

$$T_{1\_down} = \frac{LC}{V_{ref}} \cdot \left[ \frac{R_c}{L} \cdot V_{ref} + \frac{dV_o(t)}{dt}\bigg|_{t=t_0} \right]$$

wherein $T_{1\_up}$ represents a time interval $T_1$ during load increasing, T1_down represents a time interval $T_1$ during load decreasing, $V_{in}$ represents an input voltage of said synchronous rectified buck converter, $V_o$ represents said output voltage, $V_{ref}$ represents said reference voltage, L represents the inductance of said inductor, C represents the capacitance of said output capacitor, and $R_C$ represents a parasitic resistance of said output capacitor.

8. The control method as defined in claim 7, wherein said time intervals $T_2$ and $T_3$ are obtained via calculation of following equations:

$$\Delta V_{c0} = \Delta V_{th} - \Delta I_0 \cdot R_c$$

$$T_{2\_up} = \sqrt{D} \cdot \sqrt{T_{1\_up}^2 + \frac{2LC \cdot \Delta V_{c0}}{V_{in} - V_{ref}}}$$

$$T_{3\_up} = \frac{1-D}{D} \cdot T_{2\_up}$$

$$T_{2\_down} = \sqrt{1-D} \cdot \sqrt{T_{1\_down}^2 + \frac{2LC \cdot \Delta V_{c0}}{V_{ref}}}$$

$$T_{3\_down} = \frac{D}{1-D} \cdot T_{2\_down}$$

wherein $T_{2\_up}$ and $T_{3\_up}$ represent $T_2$ and $T_3$ time intervals during load increasing, $T_{2\_down}$ and $T_{3\_down}$ represent $T_2$ and $T_3$ time intervals during load decreasing, $\Delta V_{th}$ represents said default value, $\Delta I_o$ represents increment or decrement of the output current of said synchronous rectified buck converter, and D represents a duty cycle of said pulse width modulation signal.

9. The control method as defined in claim 6, wherein the step of detecting the change of said output voltage, and creating a time-optimal control signal and a select signal further comprises:
detecting a change of sudden rise of said output voltage, and outputting a voltage sudden rise signal when said output voltage suddenly rising over said default value;
detecting a change of sudden drop of said output voltage, and outputting a voltage sudden drop signal when said output voltage suddenly dropping below said default value; and
generating said time-optimal control signal and said select signal based on said voltage sudden rise signal and said voltage sudden drop signal.

* * * * *